United States Patent [19]

Rimpinen et al.

[11] 4,021,966
[45] May 10, 1977

[54] PLANTCUP ELEMENT
[75] Inventors: Heikki Rimpinen; Martti Kohonen, both of Mantta, Finland
[73] Assignee: G.A. Serlachius Oy, Mantta, Finland
[22] Filed: Apr. 8, 1976
[21] Appl. No.: 675,209
[30] Foreign Application Priority Data
Apr. 15, 1975 Finland .................. 751110
[52] U.S. Cl. .................. 47/86; 229/15; 229/28 R; 229/41 R
[51] Int. Cl.² .................. A01G 9/02
[58] Field of Search ......... 229/DIG. 3, 27, 28 R, 229/41 B, 15, 41 R; 47/34.13, 37, 34.11, 66, 73, 86

[56] References Cited
UNITED STATES PATENTS

| | | | |
|---|---|---|---|
| 2,091,126 | 8/1937 | Speer | 229/27 X |
| 2,214,525 | 9/1940 | De Murguiondo | 229/27 X |
| 2,242,149 | 5/1941 | Shelley | 47/34.13 |
| 2,680,557 | 6/1954 | Madden | 229/41 B X |
| 3,009,291 | 11/1961 | Blackmore | 47/34.13 |
| 3,164,507 | 1/1965 | Masuda | 47/37 X |
| 3,187,979 | 6/1965 | Skowronski | 229/28 R |
| 3,515,036 | 6/1970 | Oki et al. | 47/37 X |
| 3,660,934 | 5/1972 | Pollock et al. | 229/15 |

Primary Examiner—Stephen P. Garbe

[57] ABSTRACT

A plant cup element comprising a number of adjoining plant cups positioned in parallel lines. Each cup includes four planar walls each connected to two adjacent walls along foldable side edges and each cup is of a square cross-section. Two opposite walls of each cup are provided each with a folding line positioned in the middle between the side edges of the wall. Adjoining cups are connected to each other at the corner points of the walls provided with the folding lines. The walls of each cup provided with folding lines collapse in V-form when the plant cup element is pressed together in a direction perpendicular to the remaining unfoldable walls of the cups.

4 Claims, 8 Drawing Figures

PLANTCUP ELEMENT

The subject of the present invention is a plant cup element which consists of several adjoining plant cups, which are, in the operating position, rectangular and each of which is limited by four substantially planar parallel walls arranged in pairs.

Plant cup elements of this type are known, in which the individual plant cups are positioned in parallel lines side by side and one after the other and form an integral sheet-shaped element, out of which the plant cups can be broken out in order to form individual separate units. Such integral elements permit mechanical planting of plants and handling of grown plants as large groups.

According to a known construction, the plant cup element consists of several cylindrical plant cups connected to each other side by side, and according to another known construction the plant cup element is made of fibre sludge into a sheet comprising several four walled cups, in which sheet the cups are connected to each other along the top edges of the walls.

It is a drawback of these known plant cup elements that they are relatively bulky and therefore impractical from the point of view of transport and storage. This is due to the fact that the elements are relatively rigid and uncollapsible.

The purpose of the present invention is to provide a plant cup element which eliminates the above drawbacks, and this is achieved by means of the plant-cell system according to the present invention, which is characterized in that two opposite walls of each plant cup are provided with folding lines so that said walls fold together in V-form when the element is pressed together in a direction perpendicular to the remaining two walls of the plant cups and that the walls provided with folding lines of two adjoining plant cups are connected together at the corner points of the mouth opening so that they can be torn loose from each other and said walls can be folded in relation to the other walls.

When the plant cup element is designed in accordance with the present invention, it can be pressed together for transport and storage into a very small space. This is permitted by the folding lines in the walls of the cups, which lines, when the element is pressed together, always make two opposite walls in each cup fold together so that each cup can be pressed into a practically flat shape like the bellows of an accordion. The circumstance that the walls provided with folding lines in adjoining plant cups are connected to each other at the corners of the mouth opening so that the cups can be torn apart permits folding of said walls in relation to the other walls of the cup. By means of a suitable design and arrangement of the folding lines it is possible to make said folding together of the walls take place completely automatically when the element is pressed together, so that there is no risk of the cups being broken. Correspondingly, the walls are folded open completely automatically when the element is pulled open to its original width.

In such case, the two unfolding walls of each cup may be connected to each other likewise only at the corners of the mouth opening or along the entire upper edges. In the latter case the top edges may be provided with a weakening line which facilitates the tearing apart of the cups. Alternatively, the cups may be connected to each other so that they can be torn apart at the corners of the bottom.

In the case of plant cups provided with bottoms it is preferable that the bottom of each cup is loose from the two folding walls and connected to the remaining two walls along lateral folding lines, whereby a bottom folding line is formed in the middle of the bottom in parallel with said lateral folding lines. In this way the bottom is also folded together in V-shape without preventing folding of the walls of the cup.

A particular embodiment is characterized in that the folding lines of the folding walls in each cup are designed so that the walls fold in V-shaped towards the inside of the cup. Alternatively, the folding lines may be designed so that one wall folds into the cup and the other wall out of the cup, even if the former alternative is probably preferable.

The walls of the plant cups may be of a rectangular shape or they may be narrower or wider towards the bottom.

The plant cup element can be manufactured simply as an integral sheet element in a way in itself known out of fibre sludge by a vacuum-mould machine, which process is known, for example in connection with egg cases made of fibre mix, whereby the necessary folding lines etc. can be formed in the cups in connection with the manufacturing of the element. The plant cup element according to the present invention is, however, not limited to any specified material or mode of manufacturing.

The invention will be described in greater detail with reference to the attached drawings, wherein.

Figure 1:
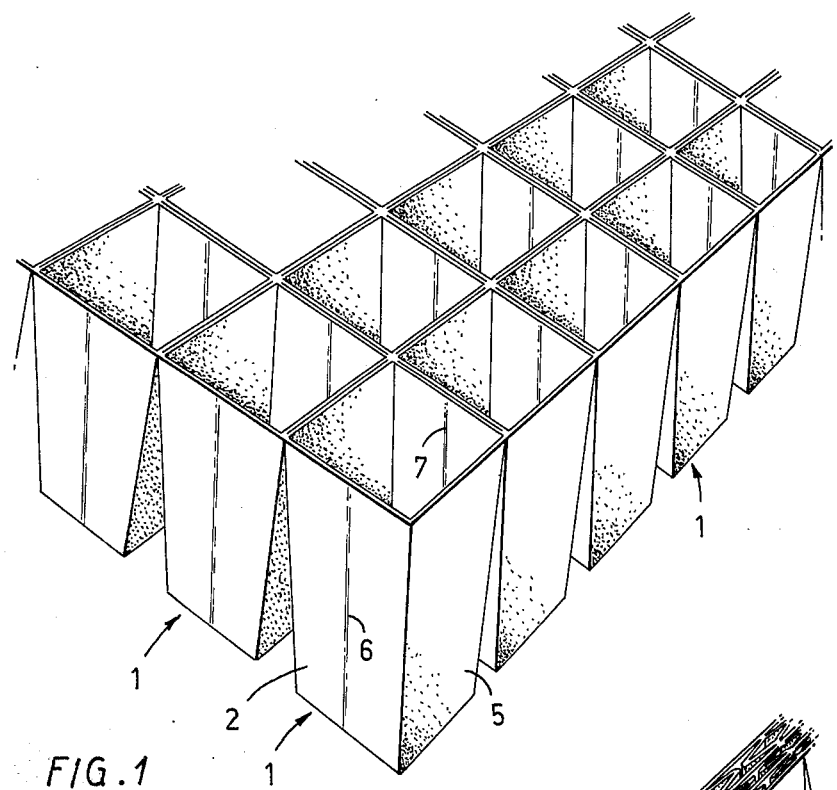
FIG. 1 is a perspective view of a favorable embodiment of a plant cup element in accordance with the present invention in the operating position.

The plant cup element shown in the drawing is made of pulp fibre sludge by means of a suction-mould machine into an integral sheet element, which comprises several individual plant cups 1, which are positioned side by side in parallel lines. Each cup includes four plane side walls 2, 3, 4 and 5, which are arranged in pairs parallel with each other. The walls are slightly narrower towards the bottom of the cup. The walls are connected to each other along the side edges 2a to 5a, which edges are, during manufacturing, provided with weakening lines so that the walls can be folded in relation to each other. In this embodiment the adjoining cups are connected to each other only at the corners of the mouth opening 2b to 5b, as appears best from FIG. 4B.

Figure 4A:
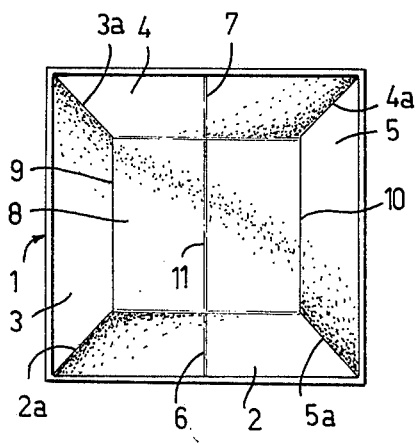
FIGS. 4A to 4C show the plant cups in FIGS. 3A and 3C viewed from above.
Figure 4B:
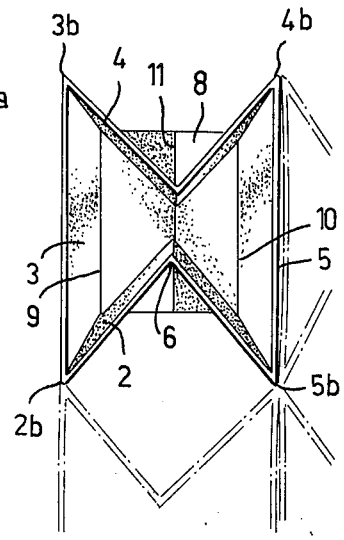
Figure 4C:
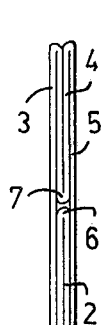

According to the invention, two opposite walls 2, 4 of each cup are, at the middle, provided in the middle with vertical folding lines 6 and 7, respectively, which lines are designed and arranged so that the walls tend to fold in V-shape inwards, as is shown in FIGS. 4B, and finally to fold completely flat between the two remaining walls 3, 5 of the cup, as appears from FIG. 4C, when the walls 3, 5 are pressed against each other.

Figure 3A:
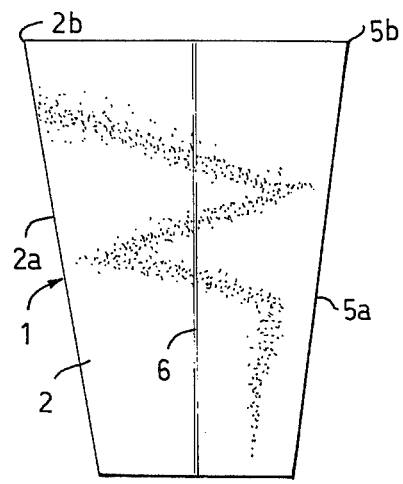
FIGS. 3A to 3C are enlarged side views of an individual plant cup in the operating position, in a partly collapsed position, and in the transport position.
Figure 3B:
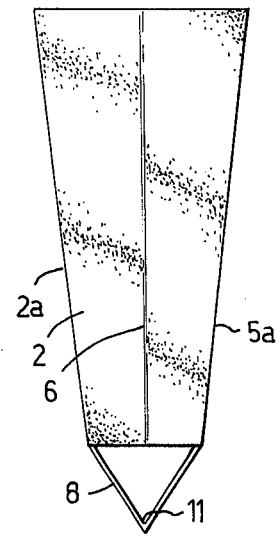
Figure 3C:
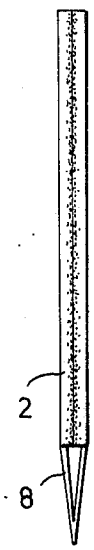

At the bottom of each cup there is a rectangular bottom 8, which is loose from both folding walls 2, 4 and connected to the two remaining walls 3, 5 along lateral folding lines 9, 10. In the middle of the bottom, a bottom folding line 11, parallel to said lateral folding lines, is formed, which line is designed and arranged so that the bottom tends to fold in V-shape outwards as is shown in FIG. 3B, and finally to fold and become completely flat, as is shown in FIG. 3C, when the walls 3, 5 are pressed towards each other.

Figure 2:
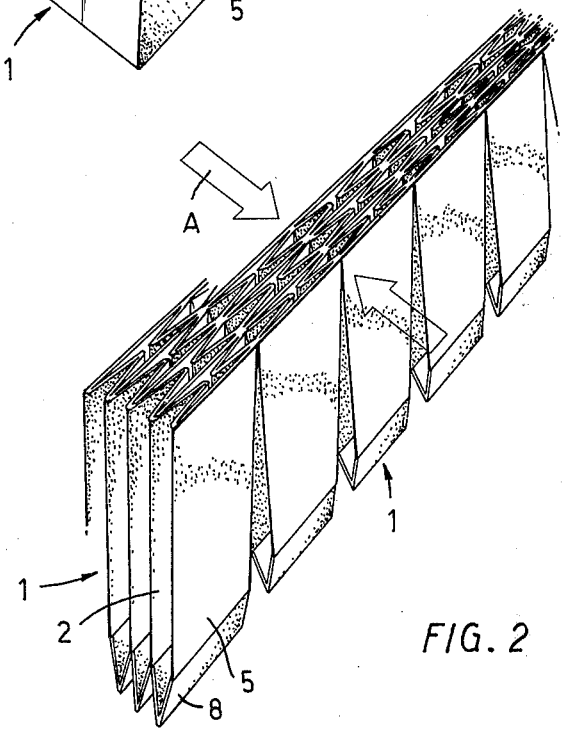
FIG. 2 shows the plant cup element in a collapsed transport position.

Owing to the described construction it is possible to make the plant cup element collapse from the operating position shown in FIG. 1 into the transport position shown in FIG. 2 when the element is pressed together in the direction indicated by the arrows A perpendicularly to the unfolding walls 3, 5. Correspondingly, the element can be opened to the operating position shown in FIG. 1 by pulling the side walls 3, 5 away from each other.

The drawing and the related description are only intended to illustrate the idea of the invention. In its details the plant cup element according to the invention may vary even to a considerable extent within the scope of the claims. Thus, if required, the cups may have no bottoms. At the beginning of the specification, other alternative embodiments are also described.

What we claim is:

1. A plant cup element comprising a plurality of adjoining plant cups, each having four bounding planar walls arranged in first and second opposed pairs and defining a mouth opening, each said cup having an operating position in which the cup is expanded and has a rectangular cross-section, said first pair of opposed walls being provided with longitudinal fold lines to permit the cup to collapse into a folded state by folding of said first pair of walls in V-form when the cup is compressed in a direction perpendicular to the second pair of walls, said walls of two adjoining cups provided with the fold lines being connected together at corner points of the mouth openings of the cups, each said cup having a bottom disconnected from said first pair of walls with the fold lines and connected to said second pair of walls along lateral fold lines, said bottom having a central fold line parallel to said lateral fold lines.

2. A plant cup element as claimed in claim 1 wherein said fold lines in the first walls of each cup are arranged so that the walls fold inwardly in said cup.

3. A plant cup element as claimed in claim 1 wherein said walls of each cup become narrower towards said bottom.

4. A plant cup element comprising a plurality of adjoining plant cups, each having four bounding planar walls arranged in first and second opposed pairs and defining a mouth opening, each said cup having an operating position in which the cup is expanded and has a rectangular cross-section, said first pair of opposed walls being provided with longitudinal fold lines to permit the cup to collapse into a folded state by folding of said first pair of walls in V-form when the cup is compressed in a direction perpendicular to the second pair of walls, said walls of two adjoining cups provided with the fold lines being connected together at corner points of the mouth openings of the cups while being disconnected between said corner points to permit said walls to fold in relation to the other walls and to allow separation of the cups from one another, said walls of each cup becoming narrower in a direction away from the mouth opening thereof, said fold lines in the first walls of each cup being arranged so that the walls fold inwardly in said cup.

* * * * *